United States Patent [19]

Miller

[11] 4,083,413
[45] Apr. 11, 1978

[54] HARROW DISC GANG

[76] Inventor: Maurice E. Miller, Stratton, Nebr. 69043

[21] Appl. No.: 723,568

[22] Filed: Sep. 15, 1976

Related U.S. Application Data

[62] Division of Ser. No. 631,145, Nov. 11, 1975, Pat. No. 4,016,935.

[51] Int. Cl.² .................................................. A01B 7/00
[52] U.S. Cl. ..................................................... 172/601
[58] Field of Search ............... 172/604, 600, 601, 602, 172/603, 596, 749, 531, 535, 599

[56] References Cited

U.S. PATENT DOCUMENTS

| 323,343 | 7/1885 | La Dow | 172/604 X |
|---|---|---|---|
| 1,158,110 | 10/1915 | Cook | 172/604 X |
| 2,136,607 | 11/1938 | Benjamin | 172/604 X |
| 2,746,371 | 5/1956 | Cook | 172/604 |
| 3,669,193 | 6/1972 | Cooper et al. | 172/604 X |
| 4,016,935 | 4/1977 | Miller | 172/601 |

Primary Examiner—George J. Marlo
Attorney, Agent, or Firm—Zarley, McKee, Thomte, Voorhees & Sease

[57] ABSTRACT

A spacer spool for a disc section of a disc harrow for preventing relative rotation between the spacer spools and the adjacent disc blades. Each of the spacer spools comprises a central portion having end portions extending outwardly from the opposite ends thereof. Each of the end portions is provided with an annular rim portion which is complimentary in shape to the adjacent disc blade. The center section of the spool is provided with a central opening for receiving an elongated shaft which is rotatably supported by the disc harrow frame. A lug is provided on each of the end portions of the spacer spool between the central opening and the annular rim portion. Each of the disc blades has a central opening formed therein for receiving the shaft and has a bolt opening formed therein spaced outwardly from the central opening. A bolt is positioned in each of the bolt openings and has its head positioned adjacent one side of the disc blade and a nut element positioned adjacent the other side of the disc blade. In the assembled condition, the head and nut of each of the bolts engages the lugs on the spacer spools positioned on opposite sides of the disc blade to prevent relative rotation between the adjacent spacer spools and the disc blade as the disc harrow is moved through the field.

2 Claims, 9 Drawing Figures

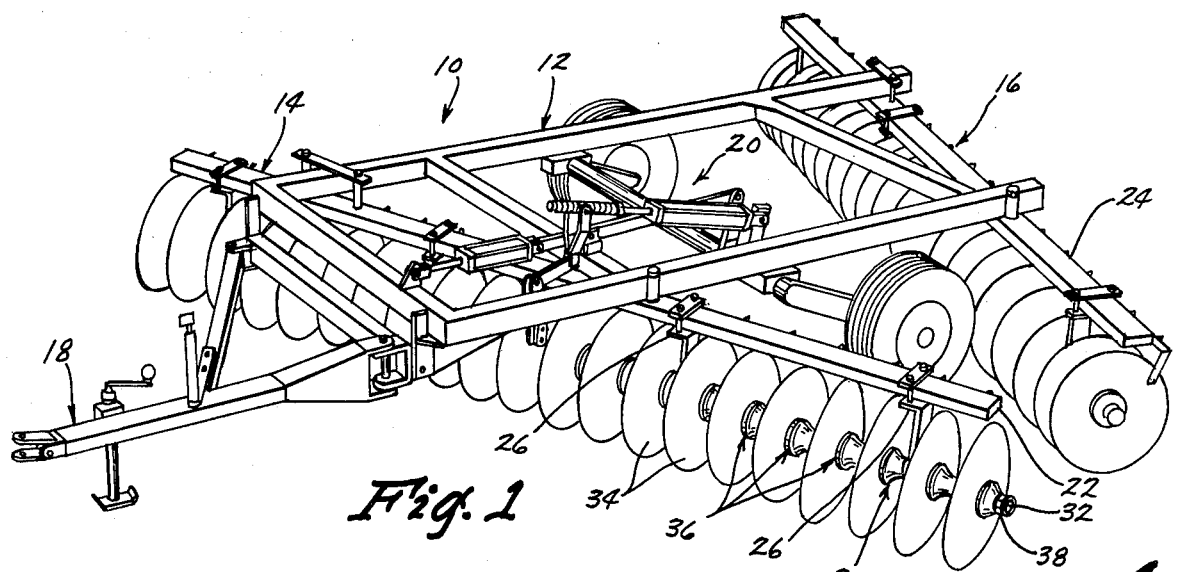
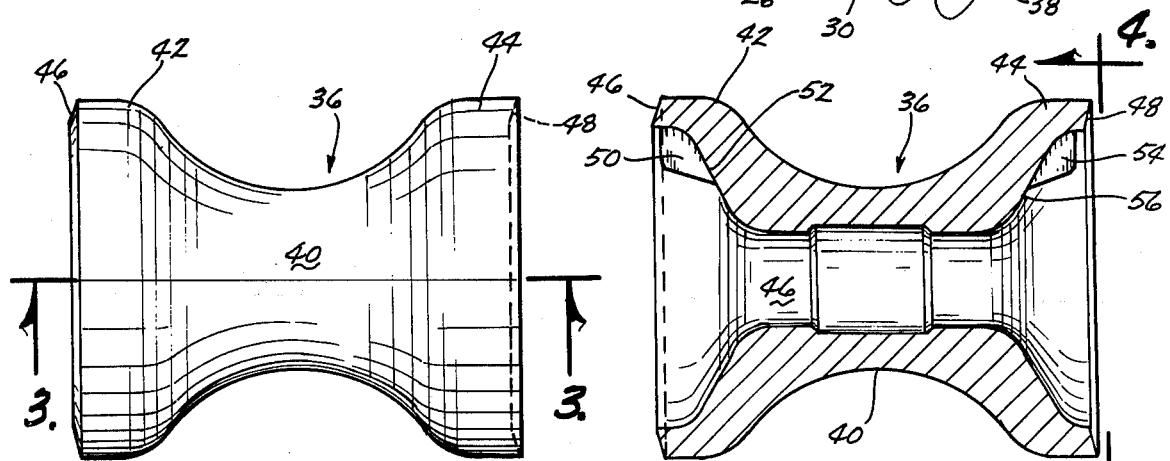
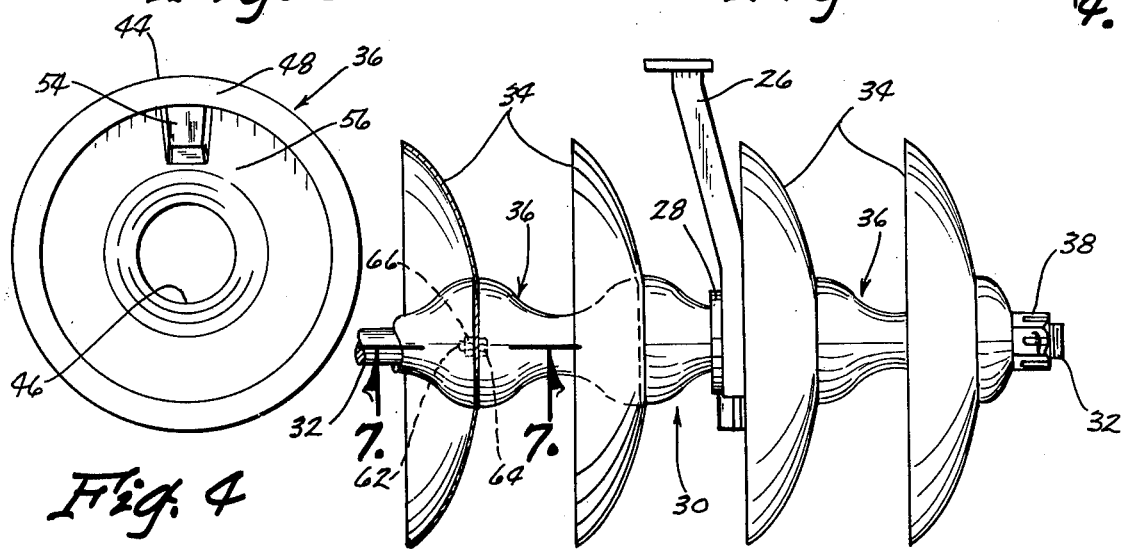

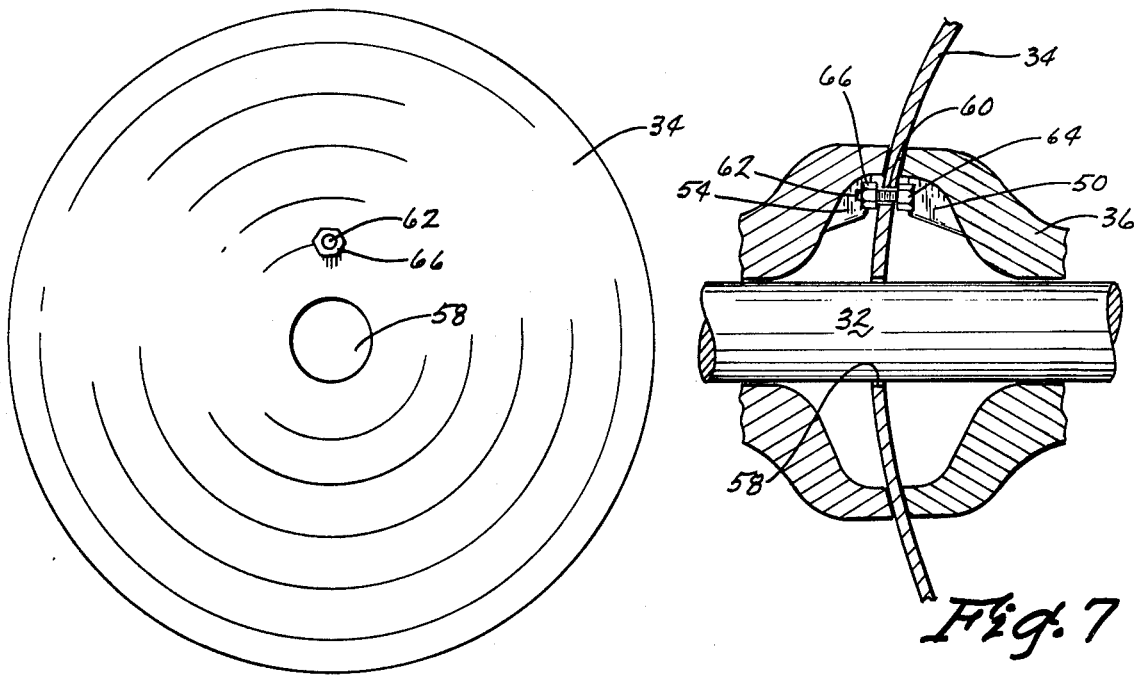
Fig. 6
Fig. 7
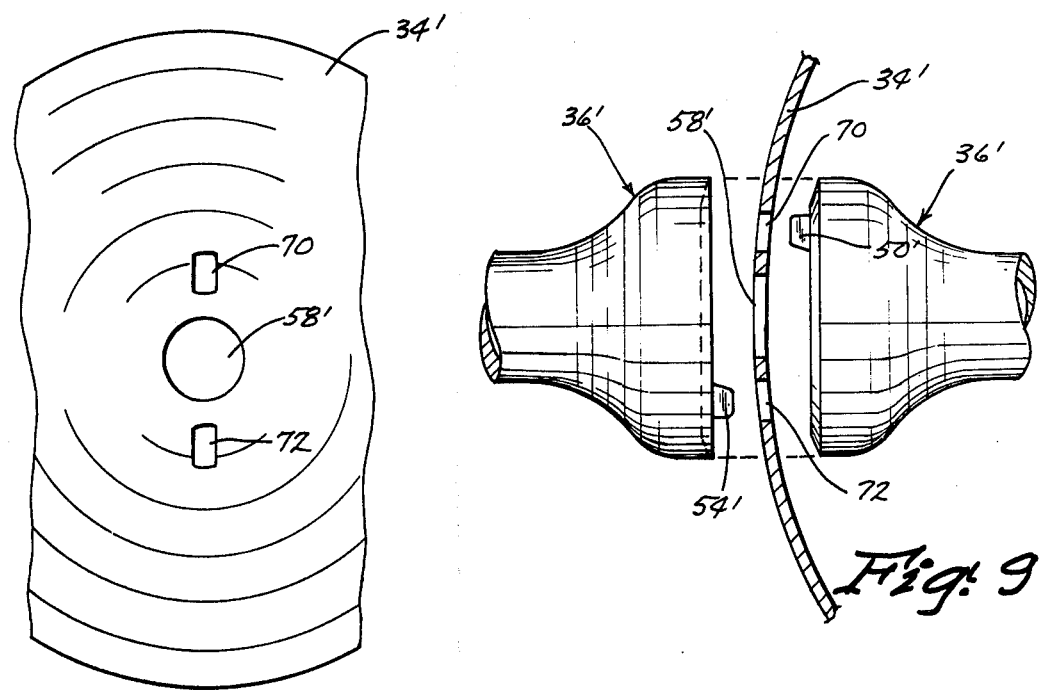
Fig. 8
Fig. 9

HARROW DISC GANG

BACKGROUND OF THE INVENTION

This is a divisional application of Ser. No. 631,145, which was filed Nov. 11, 1975, now U.S. Pat. No. 4,016,935.

Disc harrows ordinarily comprise at least one disc section including a plurality of spaced-apart disc blades mounted on a section shaft which is rotatably supported by the disc harrow. Spacer spools ordinarily are positioned between adjacent disc blades. In years past, the section shaft had a square configuration with each of the disc blades having a square opening formed in the center thereof which received the shaft extending therethrough. Many of the previous spacer spools also included a square opening formed therein which received the shaft. In those disc harrows employing square shafts, it was not a problem to prevent relative rotation between the disc blades, spacer spools and shaft. However, the problems connected with the fabrication of square shafts have led many disc harrow manufacturesrs to utilize round shafts rather than square shafts. It has been found that it is much easier to produce round shafts than to produce square shafts.

The use of round shafts in disc sections creates a serious problem in that relative rotation is experienced between the disc blades and the spacer spools as the disc harrow is moved through the field. Attempts are made to prevent such relative movement by tightening the nut at the end of the shaft but it is practically impossible to apply sufficient torque to the nut to prevent such rotation. Relative rotation between the spacer spools and the disc blades creates wear on the ends of the spacer spools which results in the need for constant tightening of the shaft nut. It is only a question of time before the spacer spools must be replaced due to the wear on the ends thereof.

Therefore, it is a principal object of the invention to provide an improved spacer spool.

A still further object of the present invention is to provide a spacer spool in combination with a disc blade wherein relative rotation is prevented between the spacer spool and the adjacent disc blade.

A further object of the invention is to provide a disc section for a disc harrow which permits the use of a round section shaft.

A further object of the invention is to provide a disc section which includes means for preventing relative rotation between the disc blades and spacer spools as the disc harrow is moved through the field.

A still further object of the invention is to provide a spacer spool which is economical to manufacture, durable in use and refined in appearance.

BRIEF DESCRIPTION OF THE DRAWINGS

FIG. 1 is a perspective view of a disc harrow;
FIG. 2 is a side elevational view of the spacer spool of this invention;
FIG. 3 is a sectional view taken on lines 3—3 of FIG. 2;
FIG. 4 is an end view of the spacer spool as seen on lines 4—4 of FIG. 3;
FIG. 5 is a partial front view of the disc harrow having the spacer spools of this invention mounted thereon;
FIG. 6 is a plan view of a disc blade;
FIG. 7 is an enlarged sectional view taken on lines 7—7 of FIG. 5;
FIG. 8 is a partial plan view of a modified form of a disc blade; and
FIG. 9 is a partial sectional view illustrating a modified form of the spacer spool.

DESCRIPTION OF THE PREFERRED EMBODIMENT

The numeral 10 refers generally to a disc or disc harrow comprising generally a frame means 12 having front and rear disc sections 14 and 16 secured thereto in an opposing manner as illustrated in FIG. 1. A hitch means 18 is provided at the forward end of the disc to enable a prime mover such as a tractor or the like to pull the disc through the field. The numeral 20 refers generally to a wheel assembly which is pivotally secured to the frame 12 to enable the frame means 12 to be raised or lowered relative to the ground. Front disc section 14 includes a tubular frame member 22 which is secured to frame means 12 by any convenient means such as illustrated in FIG. 1. Rear disc section 16 includes a tubular frame member 24 which is secured to the frame means 12 as also illustrated in FIG. 1. Inasmuch as the front and rear disc sections 14 and 16 are substantially identical in construction, only front disc section 15 will be described in detail.

A plurality of spaced-apart bearing brackets 26 are secured to frame 22 and extend downwardly therefrom. Bearings 28 are suitably mounted on the lower end of the brackets 26 and embrace bearing spools 30. An elongated section shaft 32 extends through and is rotatably supported by the bearings 28 and bearing spools 30. A plurality of spaced-apart discs 34 are mounted on the section shaft 32 and are spaced apart by means of spacer spools 36. The opposite ends of the shaft 32 are provided with threaded nuts 38 mounted thereon which maintain the discs 34, bearing spools 30 and spacer spools 36 in a tightened condition.

Each of the spacer spools 36 comprises a center section 40 and opposite end portions 42 and 44. Shaft opening 46 extends through each of the spacer spools 36 as illustrated. End portion 42 is provided with an annular rim or peripheral portion 46 which is slightly convex so as to be complimentary to the inside curvature of the adjacent disc blade 34. End portion 44 is also provided with an annular rim or peripheral portion 48 which is slightly concave so as to be complimentary to the outside curvature of the adjacent disc blade 34. End portion 42 is slightly smaller in diameter than end portion 44 since it has been found through experience that the disc blades 34 suffer less breakage if spools of different diameters are positioned on opposite sides thereof.

Lug 50 extends outwardly from surface 52 as illustrated in FIG. 3. Lug 54 extends outwardly from surface 56 as illustrated in FIGS. 3 and 4. Lugs 50 and 54 are identical and are in exact alignment with each other and are of solid material with tapered sides as shown (FIG. 4).

Each of the disc blades 34 is provided with a central opening 58 which receives the shaft 32. Each of the disc blades 34 is also provided with an opening 60 formed therein outwardly of opening 58. A bolt 62 is positioned in each of the openings 60 and has its head portions 64 at one side of the disc blade with a nut 66 positioned at the other side of the disc blade 34.

Thus, the shaft 32 extends through all of the spacer spools 36 and bearing spools 30 with the nuts 38 at the opposite ends thereof being tightened to maintain the same on the shaft. Without the lugs 50, 54 and bolts 62, tremendous force would have to be applied to the nuts 38 to cause sufficient frictional engagement between the rim portions of the spacer spools and the disc blades to prevent relative rotational movement therebetween. It has been found that it is impossible to prevent relative rotation between the spacer spools and the disc blades and such relative movement causes wear of the spacer spools at their peripheral rim portions. Wear on the peripheral rim portions of the spacer spools causes the spools and the disc blades to become loose on the shaft which necessitates continual threadable tightening of the threaded nuts 38. Eventually, the shaft and the spools have to be replaced due to the wear of the abutting surfaces.

The use of the lugs 50, 54 and the bolts 62 in the disc blades 34 prevents relative rotation between the spacer spools and the disc blades 34. In the assembled condition as illustrated in FIG. 7, the disc blade 34 at the left of one spacer spool 36 has the bolt head 64 positioned adjacent the side of the lug 50 while the disc blade 34 at the right of one spacer spool 36 has the nut 66 of the bolt 62 positioned thereagainst. Thus, when the disc section is assembled as illustrated in the drawings, the spools and the blades will only rotate relative to each other until the head portions and the nuts of the bolt 62 move into engagement with the lugs 50 and 54 which prevents further relative rotation thereby greatly increasing the life of the assembly.

A modified form of the spacer spool is illustrated in FIG. 9 and is referred to generally by the reference numeral 36'. The lug 50' at one end of the spool 36 extends outwardly beyond the end of the spool so that it will be received by the opening 70 in the disc blade 34'. The lug 54' at the opposite end of the spool 36 is offset 180° relative to lug 50' and extends outwardly beyond the end of the spool so that it will be received by the opening 72 in a disc blade 34'.

The embodiment of FIG. 9 eliminates the need for the bolts and nuts of the device of FIG. 1-7 accomplishing the same results. The relationship of the lugs 50' and 54' with respect to the openings 70 and 72 respectively prevents rotational movement between the disc blades and spacer spools thereby accomplishing all of the stated objectives.

I claim:

1. A disc section for a disc harrow including a frame means, comprising, an elongated shaft rotatably secured to said frame means, said shaft having a circular cross section, a plurality of spaced-apart disc blades mounted on said shaft for rotation therewith, a plurality of spool members mounted on said shaft, one of said spool members being mounted between adjacent pairs of disc blades, and means on said disc blades and said spool members for preventing relative rotation therebetween as the disc harrow is moved through the field, each of said spool members comprising a center section having end portions extending outwardly therefrom, each of said spool members having a central opening formed therein which receives said shaft, said means on said spool members and disc blades comprising a lug means on each of said end portions which extends outwardly of the end portion thereof towards the adjacent disc blade, each of said lug means being integrally formed with said spool members, each of said disc blades having a central opening formed therein which receives said shaft, each of said disc blades having first and second openings formed therein outwardly of said central opening, the lug means at one end of said spool member extending into the first opening in the adjacent disc blade, the lug means at the other end of said spool member extending into the second opening in an adjacent disc blade.

2. The disc section of claim 1 wherein the lug means at the opposite ends of said spool member are offset 180° with respect to each other.

* * * * *